US009465173B2

(12) United States Patent
Becker

(10) Patent No.: US 9,465,173 B2
(45) Date of Patent: Oct. 11, 2016

(54) CONNECTOR ASSEMBLY

(71) Applicant: Geospace Technologies Corporation, Houston, TX (US)

(72) Inventor: Timothy D. Becker, Cypress, TX (US)

(73) Assignee: Geospace Technologies Corporation, Houston, TX (US)

( * ) Notice: Subject to any disclaimer, the term of this patent is extended or adjusted under 35 U.S.C. 154(b) by 0 days.

(21) Appl. No.: 14/473,530

(22) Filed: Aug. 29, 2014

(65) Prior Publication Data

US 2016/0062056 A1     Mar. 3, 2016

(51) Int. Cl.
*H01R 13/52*     (2006.01)
*G02B 6/38*      (2006.01)

(52) U.S. Cl.
CPC ......... *G02B 6/3893* (2013.01); *H01R 13/5219* (2013.01)

(58) Field of Classification Search
CPC    H01R 13/5219; H01R 13/523; H01R 13/53; H01R 13/627; H01R 2101/00; H01R 33/97
USPC ........................................ 439/282, 281, 604
See application file for complete search history.

(56) References Cited

U.S. PATENT DOCUMENTS

| 4,498,719 | A  | * | 2/1985 | Juris    | H01R 13/5219 439/278 |
| 4,609,247 | A  | * | 9/1986 | Annoot   | H01R 13/5219 439/272 |
| 4,857,008 | A  | * | 8/1989 | Kee      | H01R 13/504 439/352  |
| 6,336,821 | B1 | * | 1/2002 | Hattori  | H01R 13/6277 439/282 |
| 6,558,180 | B2 | * | 5/2003 | Nishimoto| H01R 13/5221 439/271 |
| 7,195,505 | B1 |   | 3/2007 | Becker   |                      |

\* cited by examiner

*Primary Examiner* — Phuong Dinh
(74) *Attorney, Agent, or Firm* — Douglas W. Rommelmann; Andrews Kurth LLP

(57) ABSTRACT

An improved connector assembly is disclosed wherein end segment portions of a male plug have increasing cylindrical wall cylindrical wall diameter from the outer-most segment to an intermediate segment to an inner segment. The female receptacle has its female receptacle dimensions arranged to accept the male plug such that increasing cylindrical wall diameters exist from its outer-most segment to an intermediate segment to an inner-most segment. The increased diameters enhance the sealing with a strong and sustainable sealing pressure wherein coupling forces between the male plug and female receptacle are minor until the end of the insertion of the male plug into the female receptacle.

13 Claims, 2 Drawing Sheets

CONNECTOR ASSEMBLY

BACKGROUND OF THE INVENTION (1) Field of the Invention

This invention relates generally to the field of electrical or fiber-optic connectors possessing moisture and water proof integrity.

(2) Description of Prior Art

The invention described in this application is an improvement of the prior art connector of U.S. Pat. No. 7,195,505. The prior art connector is illustrated in FIG. 1 of this application. The prior art connector pair is an arrangement for producing a watertight connection for joining electrical or optical circuits. The prior arrangement includes a male connector that has an insert which defines a cylindrical plug with an outer end surface and an outer side surface. The male connector includes one or more electrical or optical contacts such as sockets or pins. The plug of the male connector is characterized by a first segment having a first groove disposed about the outer side surface at a first longitudinal distance from the outer end surface. The first segment is characterized by an outer diameter D1. A second segment is characterized by a first compliant sealing element protruding about the outer side surface at a second longitudinal distance from said first segment. The second segment is characterized by an outer diameter D2 which is not substantially different from the outer diameter D1 of the first segment.

The female connector of the prior art pair of FIG. 1 includes a shell which defines a receptacle with an inner end surface and an inner side surface. The female connector includes one or more electrical or optical contacts which correspond to the male connector contacts for mating purposes. The receptacle of the female connector is characterized by a second compliant sealing element protruding about the inner side surface approximately at the first longitudinal distance from said inner end surface and a second groove disposed about the inner side surface approximately at the second longitudinal distance from the inner end surface. In other words, the receptacle is arranged and designed to removably receive the plug such that the sealing element of the plug is received in the groove of the receptacle, and vice versa, thereby operatively coupling the contacts in a redundantly sealed environment.

(3) Identification of Objects of the Invention

A primary object of the invention described herein is to provide a connection pair that achieves improved performance over the prior art connection pair of FIG. 1.

Another object of the invention is to provide male and female geometries of the connector pair such that when the male member is axially inserted into the female member, coupling forces are negligible between the male and female members except at the very end axial movement of the male member into the female member.

Another object of the invention is to provide cylindrical material diameters of the coupling segments that vary as a function of distance from the end of the male segment, so as to enhance the sealing of the male member with the female member at the end of insertion of the male member into the female member.

SUMMARY OF THE INVENTION

The invention is for an improvement of a prior art connector pair with a male connector that includes a male plug that has a first male segment having a first cylindrical outer diameter which extends along a first longitudinal distance inwardly from an end surface and a second male segment having a second outer diameter which extends along a second longitudinal distance inwardly from the first male segment. The male connector includes a first connection path terminating at the plug.

The connection pair includes a female connector which includes a receptacle with an inner end surface and a second communication path which terminates in the receptacle. The female connection includes a first female segment corresponding and arranged to receive the first male segment of the male plug and a second female segment corresponding and arranged to receive the second male segment of the male plug.

The invention provides the second outer cylindrical diameter of the second male segment of the male plug to be substantially greater than the first outer cylindrical diameter of the first male segment of the male plug and a corresponding female segment, whereby a coupling force of the second male segment with the corresponding female segment is negligible until the end of insertion of the male plug into the female segment.

DESCRIPTION OF THE PREFERRED EMBODIMENT OF THE INVENTION

Figure 1:
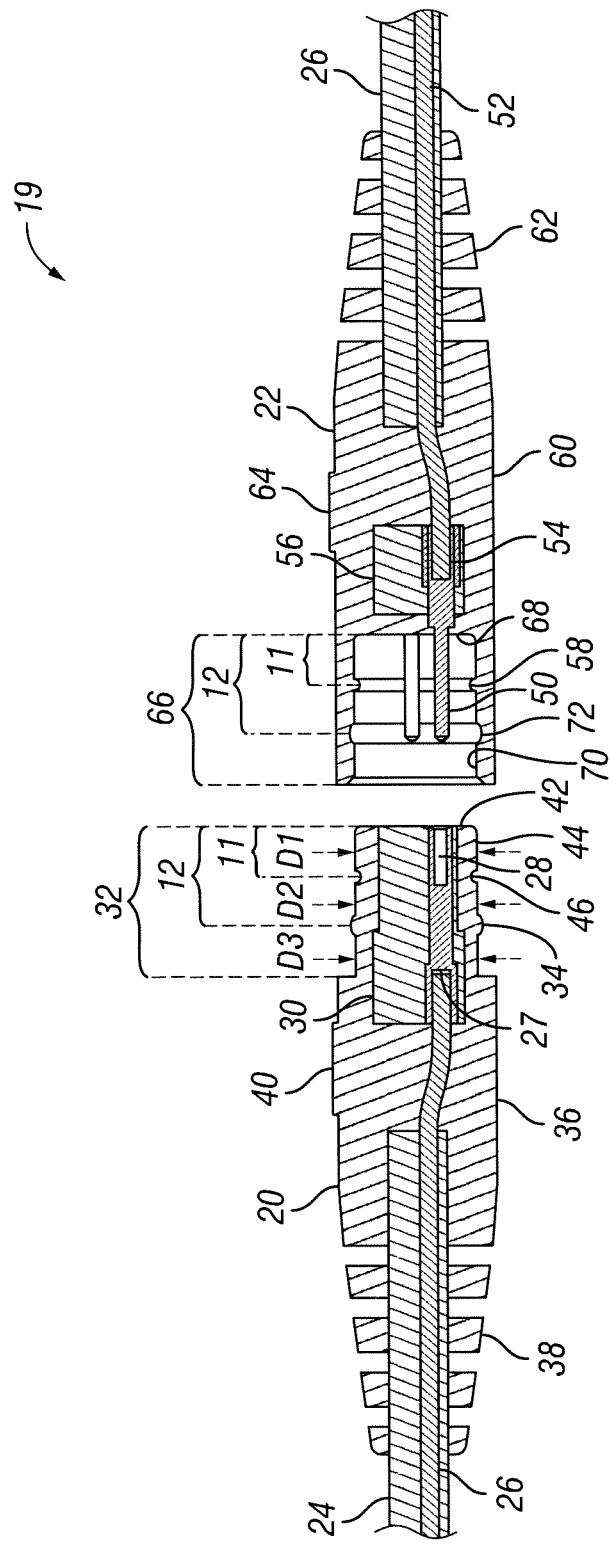
FIG. 1 shows a prior art connector pair which includes a male plug and cooperating female receptacle with segments of the plug each having a cylindrical wall diameters which are not substantially different.

FIG. 1 shows a prior art connector pair 19 which includes a male connector 20 which terminates cable 24 and a female connector 22 which terminates cable 26. The male connector 20 is designed and arranged to couple with the female connector 22.

The male connector 20 preferably includes contact sockets 28 that are electrically connected to conductors 26 in cable 24 (and/or optically connected to optical fibers in cable 24). However, contact pins, blades, spades, or similar devices may be used in place of or in addition to contact sockets as appropriate. For electrical connections, the conductors 26 are typically crimped within or soldered to tailpiece portions 27 of the contacts 28, although other suitable termination methods may be used. Any number of contacts 28 may be included as required for the application.

The contact sockets 28 are preferably seated in an insert 30 which holds the contact sockets 28 in position and which electrically (and/or optically) insulates them from each other. The insert 30 is preferably made of a ceramic or semi-rigid plastic dielectric material, although softer materials may be used, depending on the application. The insert 30 and a portion of the cable 24 are preferably overmolded, for example, by a compression molding technique, to form a completed connector, preferably including a first sealing element 34, a shell 36, a strain-relief tail 38 in the backshell region, and alignment indicia 40. The unitary overmolding preferably consists of an elastomeric material such as rubber or polyurethane, although other suitable materials may be used. Rather than using a discreet member, the insert 30 may be formed by the overmolding process and is integral with the shell 36 and the first sealing element 34.

An end portion of the insert 30 generally forms a cylindrical plug 32, although other non-cylindrical plug shapes may be used. The plug 32 includes an outer end surface 42 and an outer side surface 44. The outer side surface 44 includes one groove 46 and one sealing ridge 34. The sealing ridge 34 acts like a compliant O-ring for seating in a groove 72 disposed in the mating female connector 22, and the groove 46 is placed for accepting a sealing ridge 58 of mating female connector 22. Ideally, the groove 46 and ridge 34 are coaxially aligned with the cylindrical plug 32. Furthermore, the groove 46 and ridge 34 each ideally have a generally cross-sectional hemispheric shape. However, other sealing element profiles are known in the art and may be used as appropriate. Groove 46 is located toward outer end surface 42 of ridge 34. In other words, groove 46 is located a distance 11 from outer end surface 42, and ridge 34 is located a distance 12 from the outer end surface, where distance 12 is greater than distance 11. The cylindrical outer diameter of the outer segment is illustrated to be D1, which is not substantially different from the diameter D2 of the segment between ridge 34 and groove 46. A third segment between the ridge 34 and the interior end of plug 32 has a cylindrical wall diameter D3 which is not substantially different from diameters D2 and D1.

As illustrated in FIG. 1, the female connector 22 preferably includes contact pins 50 that are electrically connected to conductors 52 in cable 26 (and/or optically connected to optical fibers in cable 26). However, contact sockets, blades, spades, or similar devices may be used in place of or in addition to contact pins as appropriate, provided their layout matches and their styles complement the contacts 28 in mating male connector 20. For electrical connections, the conductors 52 are typically crimped within or soldered to tailpiece portions 54 of contacts 50, although other suitable termination methods may be used. Any number of contacts 50 may be included as required for the application.

The contact pins 50 are preferably seated in an insert 56 which holds the contact pins 50 in position and which electrically (and/or optically) insulates them from each other. The insert 56 is preferably made of a ceramic or semi-rigid plastic dielectric material, although softer materials may be used, depending on the application. The insert 56 and a portion of the cable 26 are preferably overmolded, for example, by a compression molding technique, to form a completed connector, preferably including a second sealing element 58, a shell 60, a strain relief tail 62 in the backshell region, and alignment indicia 64. The unitary overmolding preferably consists of an elastomeric material such as rubber or polyurethane, although other suitable materials may be used. Alternatively, rather than using a discreet member, the insert 56 can be formed by the overmolding process and can be integral with the shell 60.

A distal portion of the shell 60 generally forms a barrel-shaped receptacle 66, although other non-cylindrical receptacles may be used, provided the receptacle shape is designed and arranged to removably receive the plug 32 of the male connector 20. The outer diameters of sections of the plug 32 may be slightly greater than diameters of respective portions of the receptacle 66 to improve compression and sealing upon mating. The receptacle 66 includes an inner end surface 68 and an inner side surface 70. The inner side surface 70 includes one groove 72 and one sealing ridge 58. The sealing ridge 58 acts like a compliant O-ring for seating in groove 46 in the mating male connector 20, and the groove 72 serves as a groove for accepting the sealing ridge 34 of mating male connector 20. Ideally, the groove 72 and ridge 58 are coaxially aligned with the barrel-shaped receptacle 66. Furthermore, the groove 72 and ridge 58 each ideally have a generally cross-sectional hemispheric shape. However, other sealing element profiles are known in the art and may be used as appropriate. Groove 72 is located away from inner end surface 68 of receptacle 66. Specifically, in order to ensure that male connector 20 and female connector 22 properly mate and that the dual sealing elements 34, 58 engage simultaneously, groove 72 is located approximately the distance 12 from the inner end surface 68, and ridge 58 is located approximately the distance 11 from the inner end surface 68. In other words, the distal groove 72 of the female connector 22 is located about the same distance from the inner end surface 68 of the receptacle 66 as the proximal ridge 34 of the male connector 20 is located from the outer end surface 42 of the plug 32. Similarly, the proximal ridge 58 of the female connector 22 is located about the same distance from the inner end surface 68 of the receptacle 66 as the distal groove 46 of the male connector 20 is located from the outer end surface 42 of the plug 32. Thus, when the connector pair 20, 22 is mated, male connector sealing ridge 34 is seated in female connector groove 72, and female connector sealing ridge 58 is seated in male connector groove 46.

Elevated markers 40 and 64 are provided on male connector 20 and female connector 22, respectively, to provide both a visual and a tactile indication of the proper connector orientation to facilitate the coupling process. Markers 40, 64 are preferably integrally molded as part of the connector shell 36, 60, respectively.

Figure 2:
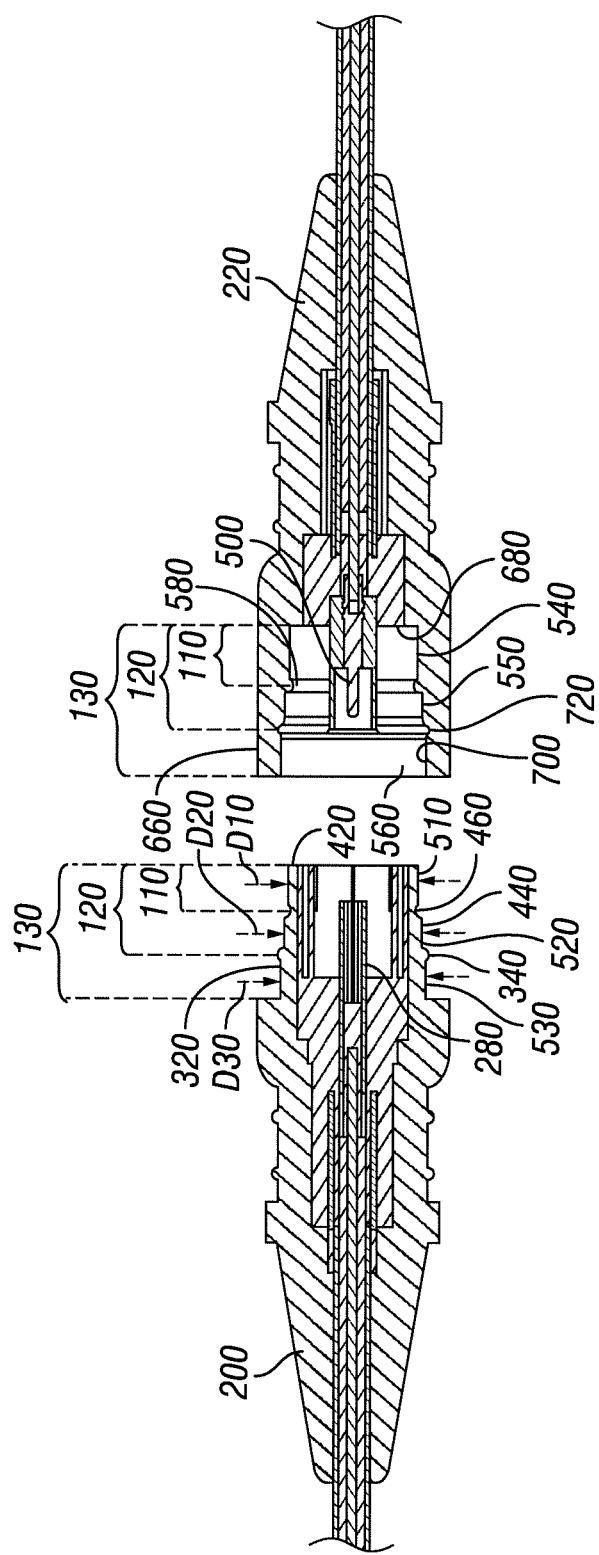
FIG. 2 illustrates an improvement to the connection pair of FIG. 1 wherein segments of the male plug and female receptacles have increasing cylindrical wall diameters from the outermost segment to the intermediate segment and from the intermediate segment to the innermost segment.

With reference to FIG. 2, the improved connector pair includes a male connector 200 having a male plug 320 with an outer end surface 420 and an outer side surface 440 and including a first communication path 280 terminating at the male plug 320. The male plug 320 has a first male segment 510 having a first cylindrical diameter D10 which extends along a first longitudinal distance 110 inwardly from the end surface 420, and a second male segment 520 having a second cylindrical diameter D20 which extends along a second longitudinal distance 120 inwardly from the first male segment 510. As shown in FIG. 2, the male plug 320 may have a third male segment 530 having a third cylindrical diameter D30 which extends along a third longitudinal distance 130 inwardly from the second male segment 520.

The improved connector pair includes a female connector 220 defining a receptacle 660 with an inner end surface 680 and a second communication path 500 terminating generally at the receptacle 660. The receptacle 660 has a first female segment 540 corresponding and arranged to receive the first male segment 510 of the male plug 320, and a second female segment 550 corresponding and arranged to receive the second male segment 520 of the male plug 320, and as shown in FIG. 2, has a third female segment 560 corresponding and arranged to receive the third male segment 530 of the male plug 320.

According to the invention the connection of FIG. 1 is improved by increasing the cylindrical wall diameters of the three segments of plug 32. As illustrated in FIG. 2, the cylindrical wall diameter of end segment 510 is D10, the cylindrical wall diameter of middle segment 520 is D20, and the cylindrical wall diameter of inner segment 530 is D30 where D30>D20>D10. Preferably, the second cylindrical diameter D20 of the second male segment 520 of the male plug 320 is substantially greater than the first cylindrical diameter D10 of the first male segment 510, and the third cylindrical diameter D30 of the third male segment 530 is substantially greater than the second cylindrical diameter D20 of the second male segment 520. When the plug 320 is inserted within female receptacle 660, the coupling forces between the male and female portions of the connector are negligible until insertion of the end of the male segment 110 into the first female segment 540. Preferably, when the male plug 320 is inserted within the female receptacle 660, the coupling force between the male and female segments of the male plug 320 and female receptacle 660, respectively, is negligible until the substantially simultaneous insertion of each male segment into the corresponding female segment.

Even though the connector of FIG. 2 is very small, the material wall thicknesses of the receptacle are large as compared to the connector size. Such thickness relatively enhances the sealing between the male plug 320 and female receptacle 660 resulting in a strong and sealing pressure between mating surfaces.

What is claimed is:

1. A connector pair comprising:
a male connector defining a plug with an outer end surface and an outer side surface, said male connector including a first communication path terminating generally at said male plug, said male plug comprising:
a first sealing groove disposed about said outer side surface at a first longitudinal distance from said outer end surface of said male connector;
a first compliant sealing element protruding about said outer side surface at a second longitudinal distance from said outer end surface, said second longitudinal distance being greater than said first longitudinal distance;
a first male segment of said outer side surface having a first cylindrical diameter (D10) extending a first length from said outer end surface to said first sealing groove;
a second male segment of said outer side surface having a second cylindrical diameter (D20) extending a second length from said first sealing groove to said first compliant sealing element; and
a third male segment of said outer side surface having a third cylindrical diameter (D30) extending a third length; and
a female connector defining a receptacle with an inner end surface and an inner side surface, said female connector including a second communication path terminating generally at said receptacle, said receptacle comprising:
a second compliant sealing element protruding about said inner side surface approximately at said first longitudinal distance from said inner end surface; and
a second sealing groove disposed about said inner side surface approximately at said second longitudinal distance from said inner end surface;
wherein,
said second cylindrical diameter (D20) of said second male segment is substantially greater than said first cylindrical diameter (D10) of said first male segment of said male plug, and
said third cylindrical diameter (D30) of said third male segment is substantially greater than said second cylindrical diameter (D20) of said second male segment of said male plug,
whereby a coupling force to join said male plug with said female receptacle is negligible until said outer side surface of said male plug contacts said second compliant sealing element of said receptacle.

2. The connector pair of claim 1, wherein,
said first sealing groove has a diameter greater than the diameter of said second compliant sealing element so as to compress said second compliant sealing element when said connector pair is mated,
said second sealing groove has a diameter less than the diameter of said first compliant sealing element so as to compress said first compliant sealing element when said connector pair is mated, and
said receptacle is arranged and designed to sealably and removably receive said plug thereby operatively coupling said first communication path with said second communication path.

3. The connector pair of claim 1, wherein said first compliant sealing element of said male connector is a compliant ridge integral with said outer side surface of said plug.

4. The connector pair of claim 1, wherein said second compliant sealing element of said female connector is a compliant ridge integral with said inner side surface of said receptacle.

5. The connector pair of claim 3, wherein said first compliant sealing element is generally semi-circular in cross-section.

6. The connector pair of claim 5, wherein said second compliant sealing element is generally semi-circular in cross-section.

7. The connector pair of claim 1, wherein the non-negligible coupling force also includes said inner side surface of said receptacle contacting said first compliant sealing element of said male plug at substantially the same time as said outer side surface of said male plug contacts said second compliant sealing element of said receptacle.

8. A connector pair comprising:
a male connector having a male plug with an outer side surface, an outer end surface and including a first communication path terminating at said male plug,
said male plug comprising:
a first male segment having a first cylindrical diameter (D10) which extends a first length inwardly from said outer end surface;
a second male segment having a second cylindrical diameter (D20) which extends a second length inwardly from said first male segment;
a third male segment having a third cylindrical diameter (D30) which extends a third length inwardly from said second male segment,
wherein said second cylindrical diameter (D20) is substantially greater than said first cylindrical diameter (D10), and said third cylindrical diameter (D30) is substantially greater than said second cylindrical diameter (D20);
a plug annular groove defined between and joining said first male segment to said second male segment; and
a plug annular ridge defined between and joining said second male segment to said third male segment; and
a female connector defining a receptacle with an inner side surface, an inner end surface and a second communication path terminating generally at said receptacle,
said receptacle comprising:
a first female segment corresponding and arranged to receive said first male segment of said male plug;
a second female segment corresponding and arranged to receive said second male segment of said male plug;

a third female segment corresponding and arranged to receive said third male segment of said male plug;

a receptacle annular groove defined between and joining said third female segment to said second female segment; and a receptacle annular ridge defined between and joining said second female segment to said first female segment, whereby a coupling force to join said male plug with said female receptacle is negligible until said outer side surface of said male plug contacts said receptacle annular ridge of said receptacle.

9. The connector pair of claim 8, wherein said plug annular ridge and said receptacle annular ridge are O-rings.

10. The connector pair of claim 8, wherein said receptacle annular ridge and plug annular groove are generally semi-circular in cross-section.

11. The connector pair of claim 10, wherein said plug annular ridge and said receptacle annular groove are generally semi-circular in cross-section.

12. The connector pair of claim 11, wherein, said plug annular groove has a diameter greater than the diameter of said receptacle annular ridge so as to compress said receptacle annular ridge when said connector pair is mated, said receptacle annular groove has a diameter less than the diameter of said plug annular ridge so as to compress said plug annular ridge when said connector pair is mated, and said receptacle is arranged and designed to sealably and removably receive said plug thereby operatively coupling said first communication path with said second communication path.

13. The connector pair of claim 8, wherein the non-negligible coupling force also includes said inner side surface of said receptacle contacting said plug annular ridge of said male plug at substantially the same time as said outer side surface of said male plug contacts said receptacle annular ridge of said receptacle.

* * * * *